United States Patent
Zhang et al.

(10) Patent No.: US 9,914,098 B2
(45) Date of Patent: Mar. 13, 2018

(54) FLUX ENHANCING AGENT FOR IMPROVING COMPOSITE POLYAMIDE REVERSE OSMOSIS MEMBRANE PERFORMANCE

(71) Applicant: General Electric Company, Schenectady, NY (US)

(72) Inventors: Xingpeng Zhang, Singapore (SG); Lawrence C. Costa, Mansfield, MA (US); Steven John Harrold, Vista, CA (US); Babu Narayanswamy, Singapore (SG)

( * ) Notice: Subject to any disclaimer, the term of this patent is extended or adjusted under 35 U.S.C. 154(b) by 0 days.

(21) Appl. No.: 15/066,635

(22) Filed: Mar. 10, 2016

(65) Prior Publication Data

US 2016/0193572 A1 Jul. 7, 2016

Related U.S. Application Data

(62) Division of application No. 13/590,867, filed on Aug. 21, 2012, now Pat. No. 9,346,023.

(51) Int. Cl.
| | |
|---|---|
| *B01D 71/70* | (2006.01) |
| *C08G 77/445* | (2006.01) |
| *B01D 61/02* | (2006.01) |
| *B01D 71/56* | (2006.01) |
| *B01D 71/82* | (2006.01) |
| *B01D 71/68* | (2006.01) |
| *C08G 69/48* | (2006.01) |
| *B01D 67/00* | (2006.01) |
| *B01D 69/02* | (2006.01) |

(52) U.S. Cl.
CPC .............. *B01D 71/70* (2013.01); *B01D 61/02* (2013.01); *B01D 61/025* (2013.01); *B01D 61/027* (2013.01); *B01D 71/56* (2013.01); *B01D 71/68* (2013.01); *B01D 71/82* (2013.01); *C08G 69/48* (2013.01); *C08G 77/445* (2013.01); *B01D 67/0011* (2013.01); *B01D 69/02* (2013.01); *B01D 2323/30* (2013.01); *B01D 2323/40* (2013.01); *B01D 2325/48* (2013.01); *B32B 2305/026* (2013.01)

(58) Field of Classification Search
CPC ......... B01D 71/56; B01D 71/70; B01D 71/78
See application file for complete search history.

(56) References Cited

U.S. PATENT DOCUMENTS

| | | | |
|---|---|---|---|
| 4,499,149 A | 2/1985 | Berger | |
| 4,633,002 A | 12/1986 | Piskoti | |
| 4,644,046 A | 2/1987 | Yamada | |
| 4,757,121 A | 7/1988 | Tanaka et al. | |
| 4,758,476 A | 7/1988 | Sekine et al. | |
| 4,781,733 A * | 11/1988 | Babcock ............. | B01D 69/125 95/49 |
| 4,898,614 A | 2/1990 | Halloran et al. | |
| 5,075,403 A | 12/1991 | Kirk | |
| 5,755,964 A | 5/1998 | Mickols | |
| 5,807,956 A | 9/1998 | Czech | |
| 5,910,302 A | 6/1999 | Halloran et al. | |
| 6,159,914 A | 12/2000 | Decoster et al. | |
| 6,201,058 B1 | 3/2001 | Mahr et al. | |
| 6,337,018 B1 | 1/2002 | Mickols | |
| 6,987,150 B2 | 1/2006 | Kurth et al. | |
| 7,244,697 B2 | 7/2007 | Terada | |
| 7,307,050 B2 | 12/2007 | Terada | |
| 7,598,296 B2 | 10/2009 | Yoo et al. | |
| 7,658,872 B2 | 2/2010 | Kurth | |
| 7,708,150 B2 | 5/2010 | Kurth | |
| 7,766,173 B2 | 8/2010 | Moon et al. | |
| 7,776,806 B2 | 8/2010 | Tokunaga | |
| 7,838,478 B2 | 11/2010 | Terada | |
| 2006/0052273 A1 | 3/2006 | Terada | |
| 2010/0181250 A1 | 7/2010 | Kim et al. | |
| 2010/0233104 A1 | 9/2010 | Drake et al. | |
| 2011/0049055 A1 | 3/2011 | Wang et al. | |
| 2011/0198282 A1 | 8/2011 | Chu et al. | |
| 2013/0112619 A1 | 5/2013 | Livingston et al. | |
| 2014/0054228 A1 | 2/2014 | Zhang et al. | |

FOREIGN PATENT DOCUMENTS

| | | |
|---|---|---|
| CN | 1441693 A | 9/2003 |
| CN | 101244367 A | 8/2008 |
| EP | 0399706 A2 | 11/1990 |
| EP | 0729742 A2 | 9/1996 |
| EP | 1958685 A1 | 8/2008 |

(Continued)

OTHER PUBLICATIONS

Chinese Patent Application No. 201380043738.X, Office Action dated Dec. 15, 2015—Unofficial English Translation Available.
Dow Corning, Xiameter(R) Material Safety Data Sheet—Xiameter(R) OFX-7700 Fluid, Dec. 6, 2010.
Idson, "Polymers in Skin Cosmetics," Cosmetics and Toiletries Magazine, Dec. 1988, vol. 103, pp. 63-68.
Li, "Preparation of Hollow Fibre Composite Reverse Osmosis Membrane," Modern Applied Science, Jan. 2010, vol. 4 (1), pp. 82-90.
U.S. Appl. No. 13/590,867, Notice of Allowance dated Dec. 15, 2015.
U.S. Appl. No. 13/590,867, Office Action dated Jun. 11, 2015.
Wang et al., "Effect of Rejection Performance on Hollow Fiber Composite Reverse Osmosis Membrane by Alcohols Additives," Modern Applied Science, Nov. 2010, vol. 4 (11), pp. 147-151.

(Continued)

*Primary Examiner* — Marc S Zimmer

(57) ABSTRACT

The present disclosure describes an additive that may be used in the manufacture of thin-film polyamide composite membranes. Thin-film polyamide composite membranes are used in filtration processes, such as reverse osmosis and nanofiltration. The additive may be an amino-siloxane compound. The amino-siloxane compound includes repeated groups of silicon bonded to oxygen with at least one amine functional group. Optionally, the amino-siloxane compound may also include a hydrophilic group. The additive reacts with an aqueous phase and an organic phase to form a thin polyamide film on a porous substrate.

6 Claims, 7 Drawing Sheets

(56) References Cited

FOREIGN PATENT DOCUMENTS

| JP | S57-105203 A | 6/1982 |
|---|---|---|
| JP | S6174627 A | 4/1986 |
| JP | S61185932 A | 8/1986 |
| JP | H04-022429 A | 1/1992 |
| JP | H059254 A | 1/1993 |
| JP | H06-157748 A | 6/1994 |
| JP | 2001-089571 A | 4/2001 |
| JP | 2003-320225 A | 11/2003 |
| WO | 2012010889 A1 | 1/2012 |
| WO | WO 2012/010889 * | 2/2012 |
| WO | 2014031271 A1 | 2/2014 |

OTHER PUBLICATIONS

Leidreiter, H.I. et al., Balanced Hair Treatment by Chemically Modified Aminosiloxanes, The World's Knowledge SOFW Journal, 128, Oct. 2002, pp. 52-56.
International Application No. PCT/US2013/051585, International Search Report and Written Opinion dated Nov. 13, 2013.
Japanese Search Report issued in connection with corresponding JP Application No. 2015-528484 dated May 16, 2017.
Notification of Reasons for Refusal issued in connection with corresponding JP Application No. 2015-528484 dated May 23, 2017.

* cited by examiner

FLUX ENHANCING AGENT FOR IMPROVING COMPOSITE POLYAMIDE REVERSE OSMOSIS MEMBRANE PERFORMANCE

CROSS REFERENCE TO RELATED APPLICATIONS

This is a divisional application of U.S. application Ser. No. 13/590,867, filed Aug. 21, 2012, which is hereby incorporated by reference.

FIELD

The present disclosure relates generally to filtration membranes and more particularly to reverse osmosis and nanofiltration membranes.

BACKGROUND

Semi-permeable membranes are used for extracting a solvent, for example water, from a solution or mixture and rejecting unwanted solutes or solids, such as salts and other contaminants. The semi-permeable membranes may be cross-linked polyamide composite membranes that comprise a separation layer supported upon a porous substrate. The separation layers are thin to maximize membrane performance while the porous substrate provides the necessary structural support. The separation layer may be a thin-film polyamide layer that is formed, coated or deposited on a porous polysulfone support. The membrane may be used in reverse osmosis or nanofiltration processes.

The separation layer may be formed on the porous support by various techniques, including interfacial polymerization. Interfacial polymerization forms a thin-film polyamide at an interface between an aqueous solution and a water immiscible organic solvent. The interface is positioned at or near the surface of the porous substrate to facilitate depositing the thin-film on the substrate.

Isopropyl alcohol can be added to the aqueous solution during interfacial polymerization. The isopropyl alcohol improves permeability characteristics but at the expense of solute rejection characteristics. Additionally, significant amounts of isopropyl alcohol are required to achieve the permeability improvements, which may increase health and safety risks that are associated with the volatility of isopropyl alcohol.

SUMMARY

This specification describes a chemical additive that is useful in forming thin-film polyamide composite membranes.

This specification also describes thin-film polyamide composite membranes comprising a substrate, and a coating layer that is made from reactants comprising an aqueous phase, an organic phase and the additive.

This specification also describes methods of making thin-film polyamide composite membranes. The methods comprising reacting an aqueous phase, an organic phase and an additive. The reaction occurs at or near the surface of the substrate and results in a polyamide separation layer forming on the substrate.

The aqueous phase may include amine monomers, polyamine monomers or other amines. The organic phase may include polyacyl halide monomers. The substrate may be a porous substrate.

The additive may be an amino-siloxane compound. An amino-siloxane compound includes repeated groups of silicon bonded to oxygen with at least one amine functional group. Optionally, the additive may include another functional group that increases the hydrophilicity of the additive, for example an oxygen and alkyl or aryl containing group, such as an ether group, polyether group or the like. The additive may cause covalent bonding of the compound with portions of a reaction product of the aqueous and organic phases.

Without being bound by theory, the additive may reduce the surface tension of the aqueous phase. The reduced surface tension may increase the rate at which amines within the aqueous phase cross the aqueous-organic interface into the organic phase. In contrast to other known chemical additives, such as alcohols, amides, sulfoxides and ketones, the additive of the present specification may also participate in the interfacial polymerization reaction. This participation may create silicon-containing materials that are incorporated into the polyamide matrix. The additive may also favourably affect cross-linking within the interfacial amide polymer.

The resulting membrane is useful, for example, in reverse osmosis or nanofiltration.

Additionally, the residual amino groups of the additive may change the thin-film polyamide composite membrane's zeta potential. Thin-film polyamide composite membranes with zeta potentials close to zero, which is reflective of a more neutral surface charge, may have a higher the resistance to fouling.

DETAILED DESCRIPTION

Figure 1:
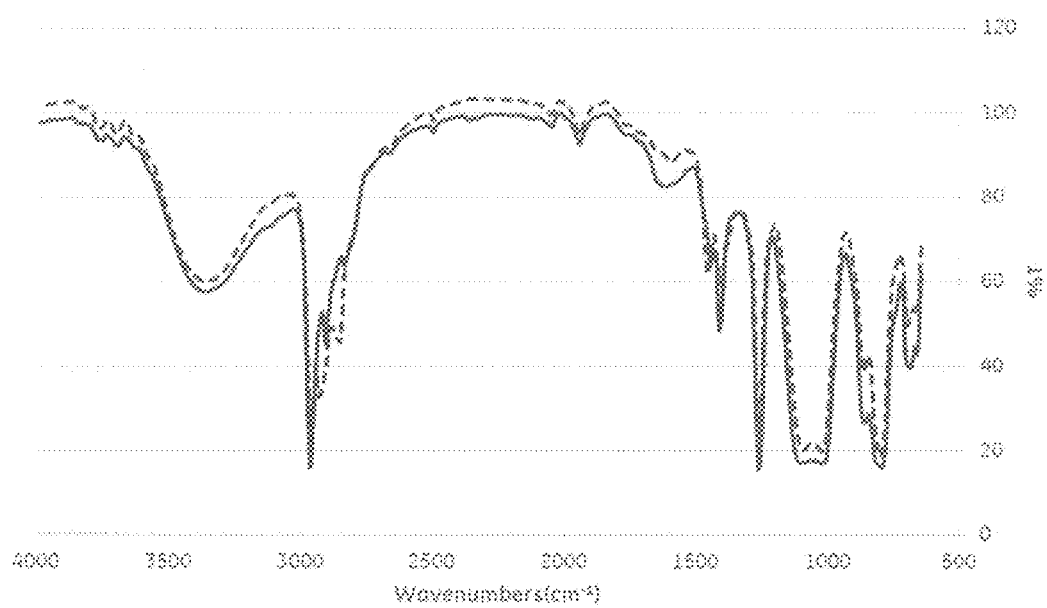
FIG. 1 is a graphical representation of Fourier Transformed Infra-red spectroscopy data from example thin-film polyamide composite membranes.
Figure 2A:
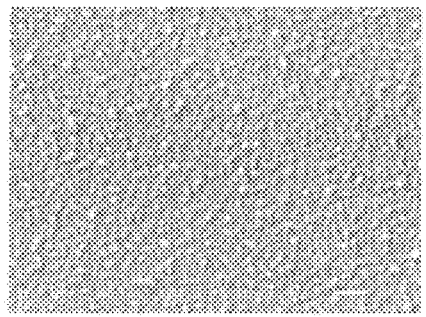
FIGS. 2A through 2D are a series of scanning electron microscope results obtained from example thin-film polyamide composite membranes.
Figure 2B:
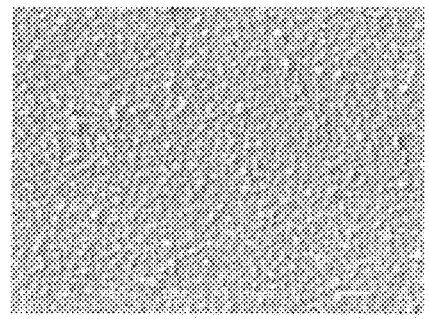
Figure 2C:
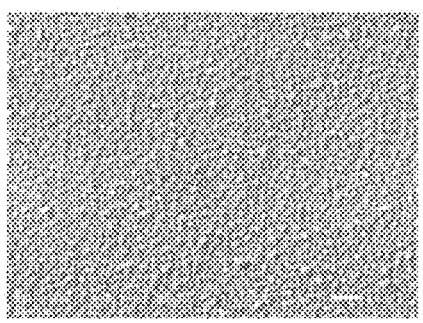
Figure 2D:
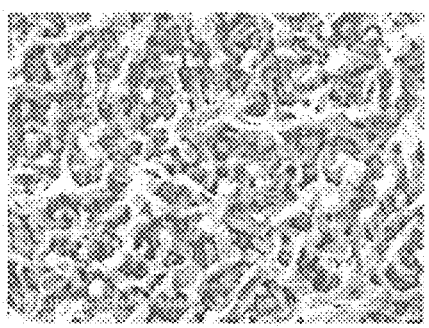

A thin-film polyamide composite membrane may comprise a substrate, a coating layer, wherein the coating layer is made from an aqueous phase, an organic phase and an additive. These thin-film polyamide composite membranes have suitable permeability characteristics to extract, for example via reverse osmosis or nanofiltration, potable water from brackish water or seawater.

The substrate provides the structural support for the coating layer. The substrate may be a porous substrate selected from a number of materials that have pore sizes that are large enough to permit the passage of water, or other permeates, therethrough. Examples of suitable porous substrate materials include fibrous and nanofibrous webs, sintered metals and sintered ceramics. Additionally, polymers such as polysulfones, polycarbonates, polyolefins, polyamides, polyimides, polynitriles, polyimines, polyphenylene ethers, polyketones, polyetherketones, halogenated polymers including polyvinylidine fluoride and the like can be used to make a suitable porous substrate.

The coating layer may comprise a polymer such as a polyamide film that is thin to optimize the filtration performance of the membrane. Performance of the membrane may be characterized by the solvent permeability properties and the solute passage properties of the membrane. Constituents of the aqueous phase, organic phase and the additive participate in the formation of the polyamide film.

The aqueous phase can include monomeric primary polyfunctional amines or monomeric secondary polyfunctional amines. The monomeric polyfunctional amines may include cyclic polyfunctional amines, for example piperazine; acyclic polyfunctional amines such as 1,2-ethanediamaine; substituted cyclic polyfunctional amines, for example methyl piperazine and dimethyl piperazine; aromatic polyfunctional amines, for example meta-phenylenediamine, o-phenylenediamine and p-phenylenedamine; substituted aromatic polyfunctional amines, for example chlorophenylenediamine, N,N$^1$-dimethyl-1,3-phenylenediamine; multi-aromatic ring polyfunctional amines, for example benzidine; substituted multi-aromatic ring polyfunctional amines such as 3,3$^1$-dimethylbenzidene, 3,3$^1$-dichlorobenzidine; or mixtures thereof. The aqueous phase can include other constituent compounds, for example triethylammonium camphorsulfonate.

The organic phase can include aromatic polyacyl halides, for example di- or tri-carboxylic acid halides such as trimesoyl chloride (1,3,5-benzene tricarboxylic acid chloride), isophthaloyl chloride, terephthaloyl chloride, 1,3,5-cyclohexanetricarbonyl chloride, 1,2,3,4-cyclopentanetetracarbonyl chloride, trimesoyl bromide (1,3,5-benzene tricarboxylic acid bromide), isophthaloyl bromide, terephthaloyl bromide, trimesoyl iodine (1,3,5-benzene tricarboxylic acid iodide), isophthaloyl iodide, terephthaloyl iodide and mixtures of di-tri and tri-tricarboxylic acid halides such as trimesoyl halide and the isomeric phthaloyl halides. The aromatic polyacyl halides may be replaced by, or mixed with, aromatic di or tri sulfonyl halides, aromatic di or tri isocyanates, aromatic di or tri chloroformates, or aromatic rings substituted with mixtures of the above. The polyacyl halides may also be substituted to improve protection from environmental attack. The organic solvent is immiscible with water and may be immiscible or sparingly miscible with polyhydric compounds and may further comprise paraffins such as n-pentane, n-hexane, n-heptane, cyclopentane, cyclohexane, methylcyclopentane, naphtha, mixtures of aliphatic hydrocarbons sold under the name Isopar®, mixtures of aliphatic and aromatic hydrocarbons; or halogenated hydrocarbons such as the Freon® series of halogenated solvents.

The additive may be an amino-siloxane compound with repeated groups of silicon bonded to oxygen with at least one amine functional group. Optionally, the additive may include a hydrophilic functional group that increases the hydrophilicity of the additive. For example, the optional hydrophilic functional group may be an oxygen and alkyl- or aryl-containing group, such as an ether, polyether or the like.

An example amino-siloxane compound is OFX-8600, which is commercially available from Dow Corning® Singapore Pte. Ltd. OFX-8600 contains an amino-siloxane component of the following formula (1) (CAS Registry Number 237753-63-8):

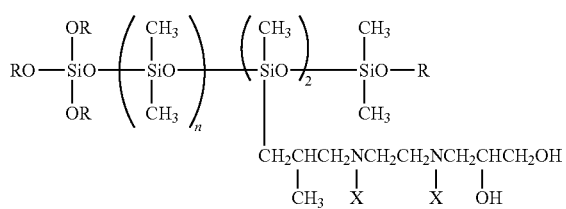

wherein R is CH$_3$ to C$_{15}$H$_{31}$; X is 75% of —CH$_2$CH(OH)CH$_2$OH and 25% H; and n is an integer between 1 and 100. (1)

Another example of an amino-siloxane compound is a compound synthesized by the reactions of formulas (2) and (3):

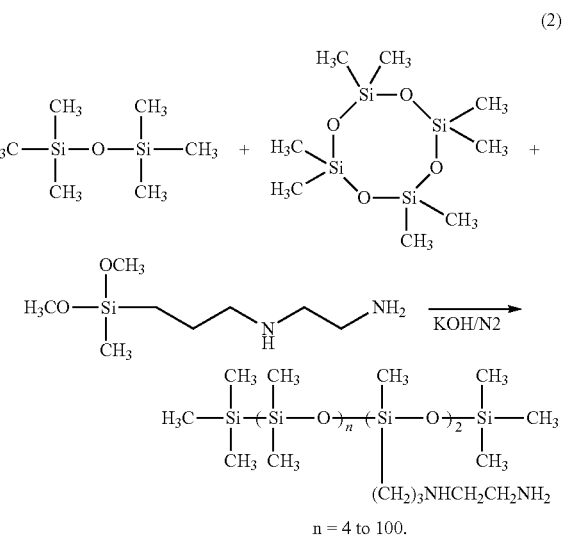

n = 4 to 100.

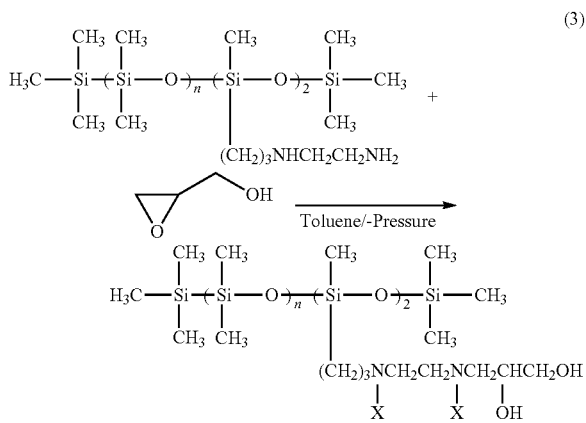

where X is either ——CH$_2$CH(OH)CH$_2$OH or H and n is an integer between 4 and 100.

The reaction product shown by formula (3) is referred to as siloxane-1. U.S. Pat. No. 4,757,121 to Tanaka et al. describes silicone-based softening agents for fibers that are formed by similar chemistry as formulas (2) and (3), the disclosure of which is incorporated herein by reference. The term "−Pressure" in formula (3) refers to a vacuum to draw off low-boiling constituents.

The experimental examples provided below demonstrate that thin-film polyamide composite membranes, which include either of the additives OFX-8600 or siloxane-1, function as semi-permeable membranes useful for reverse osmosis. Based upon these experimental results, the inventors expect that amino-siloxane compounds that contain amino side-groups and, optionally hydrophilic side groups, will similarly function as useful additives in thin-film polyamide composite membranes for reverse osmosis and nanofiltration.

The chemical structures provided herein are some examples of amino-siloxane compounds that are expected to be useful as an additive.

An example class of amino-siloxane compounds useful as an additive is represented by the following formula (4):

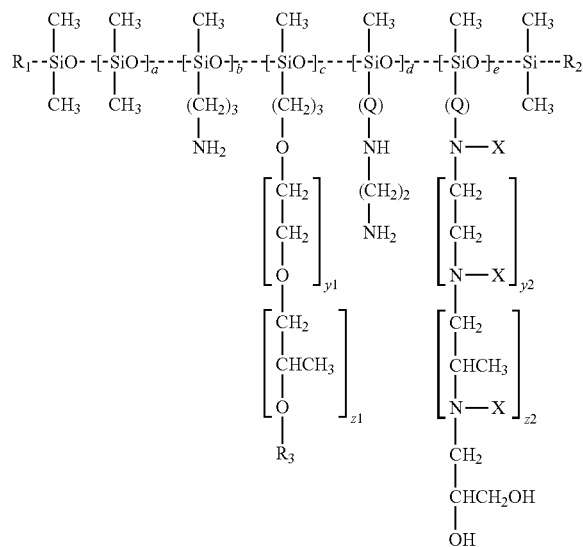

where R1 and R2 may be the same or different, and are C1-C20 alkyl or alkoxy groups; R3 may be a C1-C4 alkyl group, or H; Q is either $-(CH_2)_3-$ or $-CH_2CH(CH_3)CH_2-$; X is either $-CH_2CH(OH)CH_2OH$ or H; a, b, c, d, e are integers such that the sum of $a+b+c+d+e<100$, if b is 0, then d or e must be greater than 0, if d is 0, then b or e must be greater than 0; and if e is 0, then b or d must be greater than 0; and, y1, y2, z1, z2 are each integers between 0 and 10. (4)

Another example class of amino-siloxane compounds useful as an additive is represented by the following formula (5):

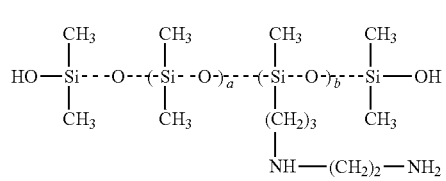

wherein a and b are integers between 1 and 100 and the sum of a+b is not greater than 100. (5)

Another example class of suitable amino-siloxane compounds useful as an additive may be represented by the following formula (6):

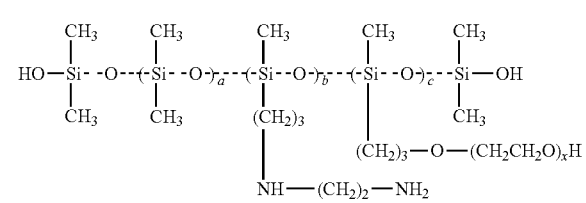

wherein a, b and c are integers between 1 and 100, the sum of a+b+c is not greater than 100 and x is an integer between 1 and 50. (6)

Another example class of suitable amino-siloxane compounds useful as an additive may be represented by any of the following compounds:

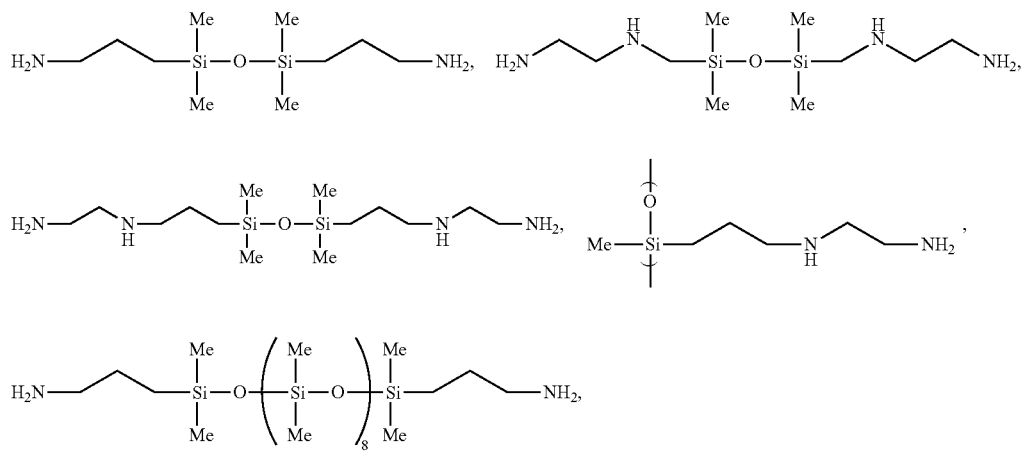

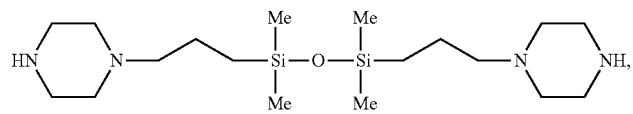
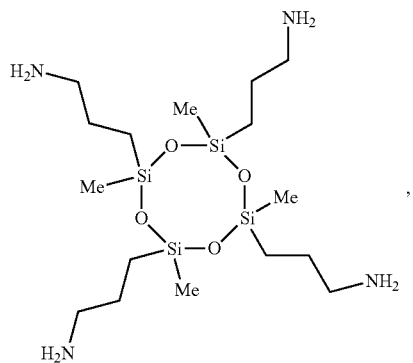
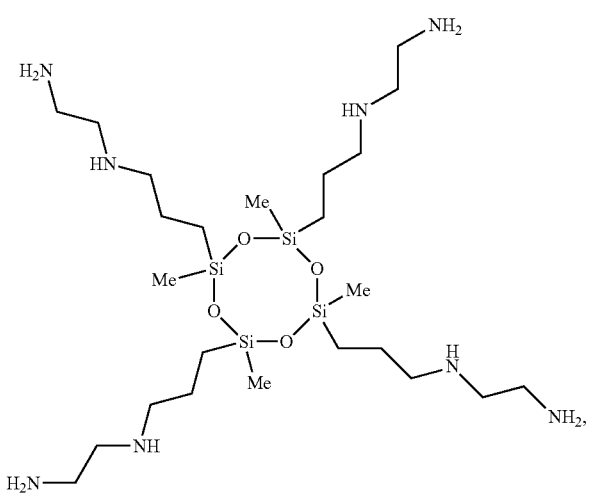
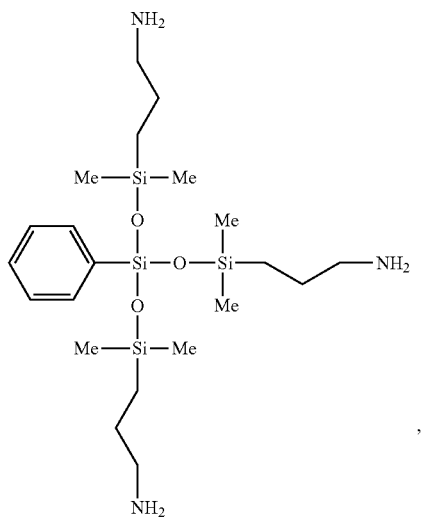
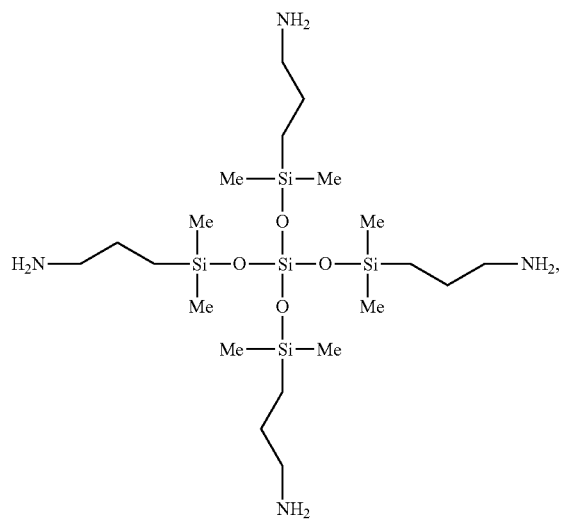

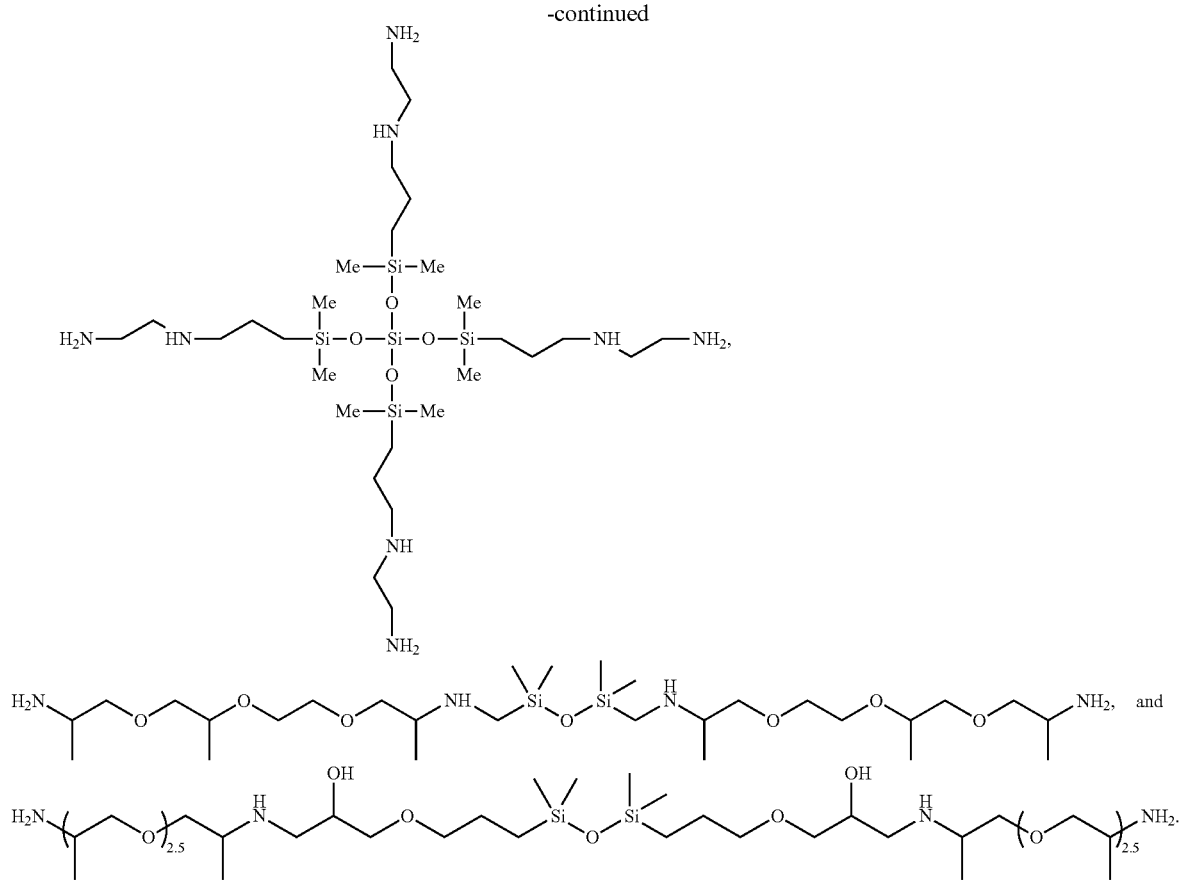

Thin-film polyamide composite membranes are made by reacting the aqueous phase, the organic phase and the additive on or near the surface of the substrate. Optionally, the additive is added to the aqueous phase. In this option the aqueous phase, inclusive of the additive, is a single component that reacts with the organic phase in a two-component reaction process.

Processes for making the thin-film polyamide composite membranes are known to those skilled in the art. One example of a useful process is interfacial polymerization. Interfacial polymerization includes contacting the aqueous phase with the substrate. The organic phase is added to and reacts with the aqueous phase. The aqueous phase and the organic phase are immiscible and, therefore, when they come into contact an interface is formed. The interface is located at or near the surface of the substrate. At the interface, the amine monomers in the aqueous phase react with the polyacyl halide monomers in the organic phase to form an amide polymer that is deposited on or near the surface of the substrate. The rate of polymerization, and hence the rate of forming the thin-film, may be modified by temperature or the addition of catalysts. The interfacial polymerization reaction may be carried out at a temperature ranging from about 5° C. to about 60° C., preferably from about 10° C. to about 40° C. Optionally, the additive can be added to the aqueous phase before the organic phase is added.

The reaction of the aqueous phase, the organic phase and the additive may occur by batch-methods which employ, for example, a hand-frame apparatus suitable for laboratory scale preparations, as described below. The reaction of the aqueous phase, the organic phase and the additive may also occur by continuous processes, such as roll-to-roll methods for pilot scale and full-scale production.

The hand frame coating apparatus consists of a matched pair of frames for holding the substrate for coating. A porous substrate is soaked in de-ionized water for at least 30 minutes and then fixed between two 8 inch by 11 inch (approximately 20.3 cm by 27.9 cm) plastic frames and kept covered with water until use. Excess water is removed from the porous substrate and then one surface of the porous substrate is coated with the aqueous phase. In one option, the additive can be added to the aqueous phase prior to coating the porous substrate. In another option, the additive can be added to the porous substrate separately from the aqueous process.

The upper portion of the frame confines the aqueous phase to the surface of the porous substrate. After a period of time, for example 120 seconds, the aqueous phase may be removed from the surface of the porous substrate by tilting the frame to pour off the aqueous phase until only isolated drops of the aqueous phase, optionally inclusive with the additive, are visible on the coated surface of the porous substrate. The coated surface of the porous substrate may be treated with a gentle stream of air to remove the isolated drops of the aqueous phase. Some amount of the aqueous phase remains within or upon the surface of the porous substrate as an aqueous coating. The aqueous coated surface of the porous substrate is then contacted with the organic phase and the constituents of the aqueous phase, the organic phase and the additive react.

The reaction product of the aqueous phase, the organic phase and the additive can be deposited upon or near the surface of the porous substrate. For example the reaction product can be a thin-film polyamide. The reaction product may also include a compound that is the reaction product of the organic phase and the additive.

Experimental Examples of Additive Synthesis

The inventors synthesized an example amino-siloxane compound by the reactions of formulas (2) and (3) from above to form siloxane-1. A 100 mL 3-neck round bottom flask equipped with a thermometer and stirrer was used to react 2.06 g of 3-(N-2-aminoethyl)amino propyl methyl dimethoxy silane; 25.5 g of octamethyl cyclotetrasiloxane; 0.81 g of hexamethyl disiloxane; 0.022 g of potassium hydroxide and 0.142 g of dimethyl sulfoxide. The reaction proceeded for six hours at 110° C., under a stream of nitrogen gas. Next 0.024 g of acetic acid was added and the mixture was further agitated at 100° C. for an hour. The reaction mixture was then stripped of low-boiling constituents at 100° C. for two hours, under vacuum. This produced the reaction product of formula (2) above.

A 10 g measure of the reaction product of formula (2) was added to a 100 mL round-bottom flask with 5 g of toluene and 0.6475 g of glycidyl alcohol and the mixture was stirred for five hours at 80° C. This mixture was then stripped, under vacuum, of low-boiling constituents at 100° C. for two hours, to produce siloxane-1 the product of formula (3) above.

FIG. 1 depicts the Fourier Transformed Infra-red spectral comparison of OFX-8600 (dotted line) and siloxane-1 (shown in the solid line). The spectra are approximately 95% similar with differences in functional groups, at least around the frequency of about 3000 cm$^{-1}$. These differences may be explained by a minor component of aliphatic alcohols present in the OFX-8600.

Experimental Examples of Membranes

The following description of example thin-film polyamide composite membranes includes chemical structures, formulas, masses and ratios that are provided as examples and not as limitations.

The example thin-film polyamide composite membranes were made and tested using standard laboratory procedures that reflect larger-scale industrial processes, tests and applications.

The following example thin-film polyamide composite membranes were all formed on a porous polysulfone substrate using the hand frame apparatus technique described above. Semi-permeable membranes with similar properties may be formed by various techniques, for example roll-to-roll coating and other processes that are used in larger-scale, industrial processes for manufacturing thin-film polyamide composite membranes.

Example 1 was formed using the following compounds: meta-phenylenediamine (MPD), triethylammonium camphorsulfonate (TEACSA), and trimesoyl chloride (TMC) in a mass ratio of 1.5:8:0.2, respectively. To achieve these ratios, 1.5 g of MPD and 8 g of TEACSA were mixed with enough water to make a total mass of 100 g of the aqueous phase. The organic phase was made by combining 0.2 g of TMC with 99.8 g of Isopar® G for a total mass of 100 g. No additive was included in Example 1, which is provided as a comparator for Example 2 as described below.

To investigate the addition of an amino-siloxane additive on the surface characteristics of a thin-film polyamide composite membrane Example 2 was formed using the same compounds, in the same mass ratio, as Example 1. Example 2 included OFX-8600 as the amino-siloxane additive at a concentration of 250 ppm, in relation to the total mass of the aqueous phase. To achieve the 250 ppm concentration of OFX-8600, the aqueous phase was made with 1.5 g of MPD, 8 g of TEACSA, 0.025 g of OFX-8600 and enough water was added to make an aqueous phase with a final mass of 100 g. The organic phase was made as described in Example 1.

Example 3 was formed using the following compounds: MPD, TEACSA and TMC in a mass ratio of 2.75:6.6:0.2, respectively. The aqueous phase was made with 2.75 g of MPD, 6.6 g of TEACSA and enough water to make an aqueous phase with a final mass of 100 g. The organic phase was made by combining 0.2 g of TMC with 99.8 g of Isopar® G for a total mass of 100 g. Example 3 does not contain any amino-siloxane additive and it is provided as a comparator for Examples 4 to 7.

Examples 4 to 7 were formed using the same compounds as Example 3 and these examples included various concentrations of OFX-8600 as the amino-siloxane additive, as set out in Table 1 below. To achieve these concentrations of OFX-8600 in the aqueous phase, 2.75 g of MPD, 6.6 g of TEACSA and one of 0.1 g, 0.025 g, 0.05 g or 0.08 g of OFX-8600 (Examples 4, 5, 6, and 7 respectively) were mixed with enough water to make a total aqueous-phase mass of 100 g. The organic phase was made as described above for Example 3.

TABLE 1

Amount of OFX-8600 in Experimental Examples 3 to 7.

| Example | OFX-8600 (ppm in relation to total mass of aqueous phase) |
|---|---|
| 3 | 0 |
| 4 | 1000 |
| 5 | 250 |
| 6 | 500 |
| 7 | 800 |

FIGS. 2A through 2D are scanning electron microscope images of the surface of the thin-film polyamide composite membranes of Examples 1 to 4, respectively. The scale bar presented in each image is 1 micron. At this scale Example 2, which included the OFX-8600, did not exhibit any visually apparent difference as compared to Example 1, which lacked OFX-8600. However, in Example 4, which included 1000 ppm of OFX-8600, a change in membrane morphology is visible, which may have resulted in an increase in the active area of the separation layer (see FIG. 2D).

As described in Table 1 above, Example 5 includes the OFX-8600 material added at a concentration of 250 ppm, in relation to the total mass of the aqueous phase.

The permeability and passage characteristics of Examples 3, 4 and 5 were tested in a reverse osmosis cell by 15 minutes of flushing with a 2000 ppm saline solution at a pressure of 225 psi (approximately 15.5 bar). These conditions are typical for brackish water reverse osmosis processes. Table 2 provides the permeability (A) and passage (P) results of samples taken over a ten minute collection period. The A value represents the permeability and can be calculated by formula (7):

$$A = \text{permeate volume}/(\text{membrane area} \times \text{time} \times \text{net driving pressure}). \tag{7}$$

Permeate volume is reflected by the units of $10^{-5}$ cm$^3$. Membrane area is measured in cm$^2$, time is measured in seconds and the net driving pressure is measured in atms at 25° C. The net driving pressure is the average trans-membrane pressure less the osmotic pressure difference between the saline solution and the permeate.

The P values are determined by the solute concentration in the permeate divided by the average solute concentration in the saline solution and in the concentrate, expressed as a percentage by the following formula (8):

$$\text{Passage (\%)} = \text{permeate concentration}/((\text{feed concentration} + \text{concentrate concentration})/2). \quad (8)$$

TABLE 2

Permeability (A) and passage (P) results for Examples 3, 4 and 5.

| | Mean Permeability (A) | Mean Passage (P) |
|---|---|---|
| Example 3 | 6.1 | 0.54 |
| Example 4 | 9.68 | 0.55 |
| Example 5 | 10.63 | 0.49 |

Table 3 below provides the mean permeability (A) results for another set of Examples 3, 4, and 5 that were tested under similar reverse osmosis conditions as described above but over a 5.5 hour time frame.

TABLE 3

Permeability (A) results for Examples 3, 4 and 5, over time.

| Sample | Mean Permeability (A) at 0.25 h | Mean Permeability (A) at 5.5 h | Percent Decrease in Permeability (A) |
|---|---|---|---|
| Example 3 | 6.06 | 5.20 | 14.19 |
| Example 4 | 10.47 | 8.92 | 14.80 |
| Example 5 | 9.85 | 8.53 | 13.40 |

Figure 3A:
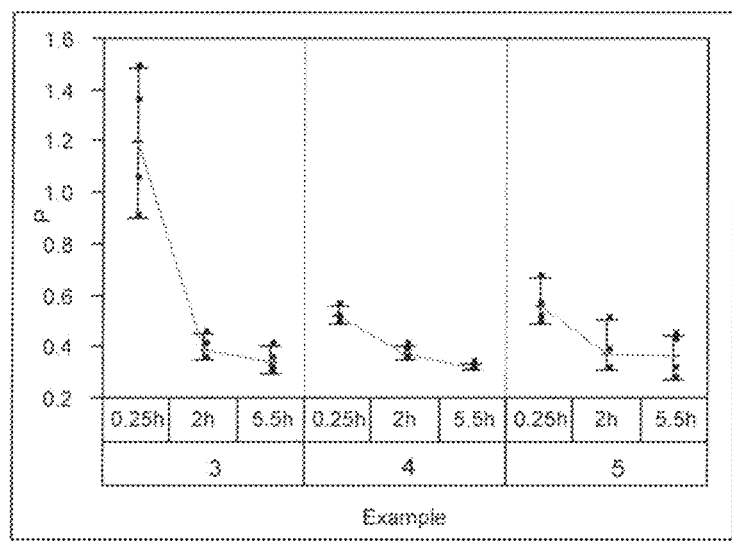
FIGS. 3A and 3B are graphic representations of passage data, over time, from example thin-film polyamide composite membranes.

The passage characteristics of Examples 3, 4 and 5 over the 5.5 hours time frame are shown in FIG. 3A.

To investigate any concentration effect of the amino-siloxane additive, Examples 6 and 7 were made with the same, in the same mass ratios, as Example 3. As described above in Table 1, Example 6 included 500 ppm of OFX-8600 and Example 7 included 800 ppm of OFX-8600, in relation to the total mass of the aqueous phase.

To test the permeability and passage functions of the example thin-film polyamide composite membranes, Examples 3, 4, 5, 6, 7 were placed in a reverse osmosis chamber and flushed for 15 minutes by a 2000 ppm saline solution at a pressure of 225 psi (approximately 15.5 bar), with samples collected over 10 minutes. An additional formulation of Example 3 with 10% isopropyl alcohol, on a mass basis, was also included (shown as 10% IPA in FIGS. 4A and 4B).

Figure 4A:
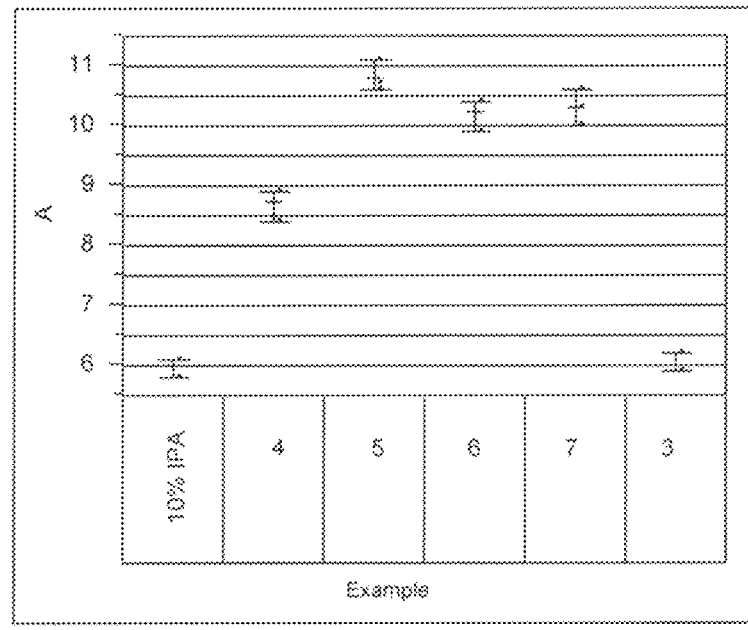
FIGS. 4A and 4B are graphic representations of permeability data and rejection data, respectively, from example thin-film polyamide composite membranes.
Figure 4B:
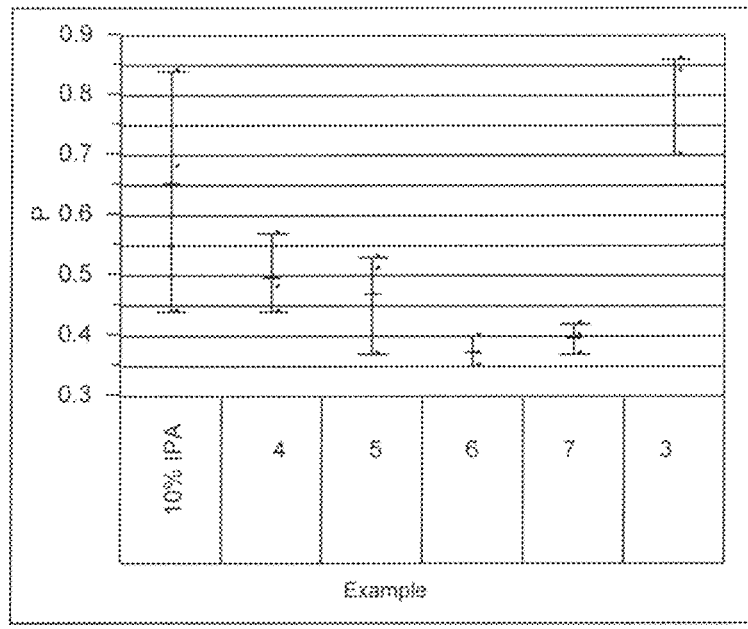

FIG. 4A depicts the permeability (A) of Example 4 as greater than Example 3 and the 10% IPA formulation. Examples 5, 6 and 7 demonstrated greater permeability than Example 4. FIG. 4B depicts the passage properties of these examples.

Figure 5:
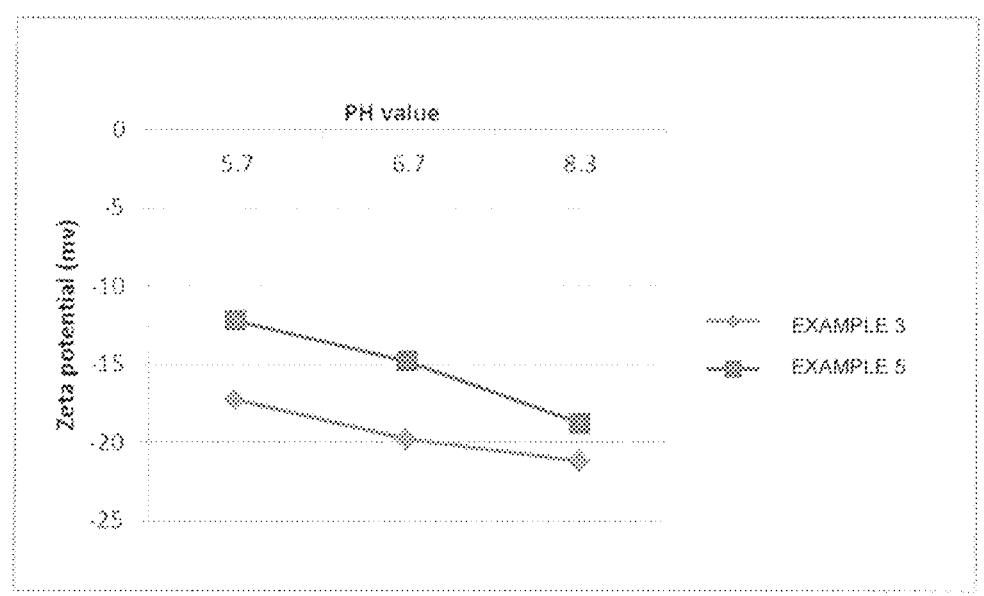
FIG. 5 is a graphical representation of zeta potential data over a pH range from example thin-film polyamide composite membranes.

FIG. 5 is a line graph that depicts the zeta potential versus pH measured on Examples 3 and 5 after the 5.5 hours of reverse osmosis flushing. Example 5 demonstrated an approximately 5 mV shift towards a zeta potential of zero. This may reflect a lower fouling potential as a result of utilization of the amino-siloxane additive.

To further investigate any effect of time on permeability and passage properties, Example 8 was formed using the following compounds: MPD, TEACSA and TMC in a ratio of 4:6:0.2, respectively. To make the aqueous phase 4 g of MPD and 6 g of TEACSA were added to enough water to make a final mass of 100 g of the aqueous phase. No additive was included in Example 8, which is provided as a comparator for Examples 9 and 10 below. The organic phase was made as described in Example 3.

Examples 9 and 10 were formed using the same compounds, in the same mass ratio, as Example 8. Example 9 included 1000 ppm of OFX-8600, in relation to the total mass of the aqueous phase, and Example 10 included 250 ppm of OFX-8600, in relation to the total mass of the aqueous phase. To achieve these concentrations, 4 g of MPD, 6 g of TEACSA and either 0.1 g (Example 9) or 0.025 g (Example 10) were combined with enough water to make a final mass of 100 g. The organic phase was made as described above.

Table 4 below provides the permeability (A) results for Examples 8, 9 and 10 over time. These membranes were tested under similar conditions as described above for Table 2, except these examples were flushed for 3.5 hours with a 32000 ppm saline solution at a pressure of 800 psi (approximately 55.2 bar). These conditions are typical of seawater reverse osmosis processes.

TABLE 4

Permeability (A) results for Examples 8, 9 and 10, over time.

| Sample | Mean Permeability (A) at 0.4 h | Mean Permeability (A) at 3.5 h | Percent Decrease in Permeability (A) |
|---|---|---|---|
| Example 8 | 2.94 | 2.68 | 8.84 |
| Example 9 | 3.32 | 2.96 | 10.84 |
| Example 10 | 4.67 | 4.19 | 10.28 |

Figure 3B:
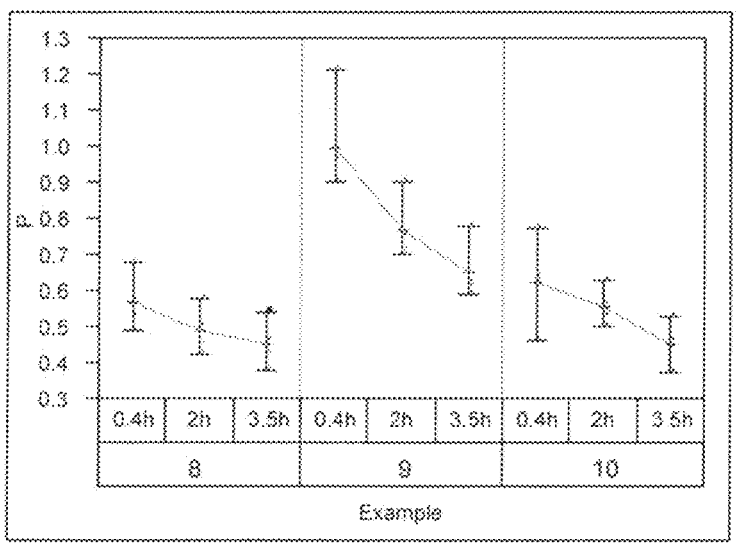

The passage characteristics of Examples 8, 9 and 10 are shown in FIG. 3B.

To investigate the synthesized siloxane-1, Example 11 was formed in a hand frame apparatus using the following compounds: MPD, TEACSA and TMC in a mass ratio of 2.75:6.6:0.2, respectively, which are the same compounds and ratios of Example 3 above. The siloxane-1 material was added at a concentration of 250 ppm, in relation to the total mass of the aqueous phase. To achieve this concentration of siloxane-1 in the aqueous phase, 2.75 g of MPD, 6.6 g of TEACSA, 0.025 g of siloxane-1 were mixed with enough water to make a total aqueous-phase mass of 100 g. The organic phase was made as described above for Example 3.

The permeability and passage function of Example 11 was compared with Examples 3 and 5 in a reverse osmosis chamber by 15 minutes of flushing with a 2000 ppm saline solution at a pressure of 225 psi (approximately 15.5 bar), with samples collected over 10 minutes.

Figure 6A:
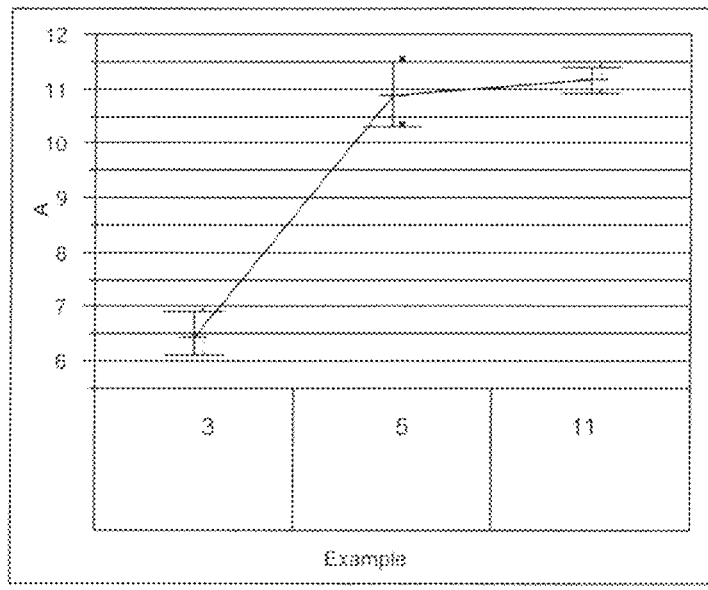
FIGS. 6A and 6B are graphic representations of the permeability data and the solute rejection data, respectively, from example thin-film polyamide composite membranes.
Figure 6B:
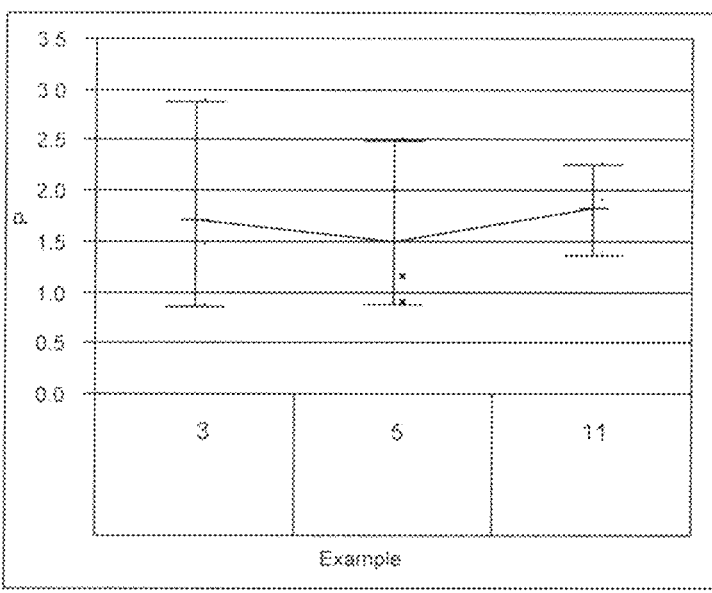

FIG. 6A shows that the permeability (A) of Example 5, which included 250 ppm of OFX-8600 and Example 11 are very similar and both are higher than Example 3, which did not include any additive. Further, the passage characteristics of all three samples are similar (FIG. 6B).

Experimental Example of Further Reaction Product

Figure 7:
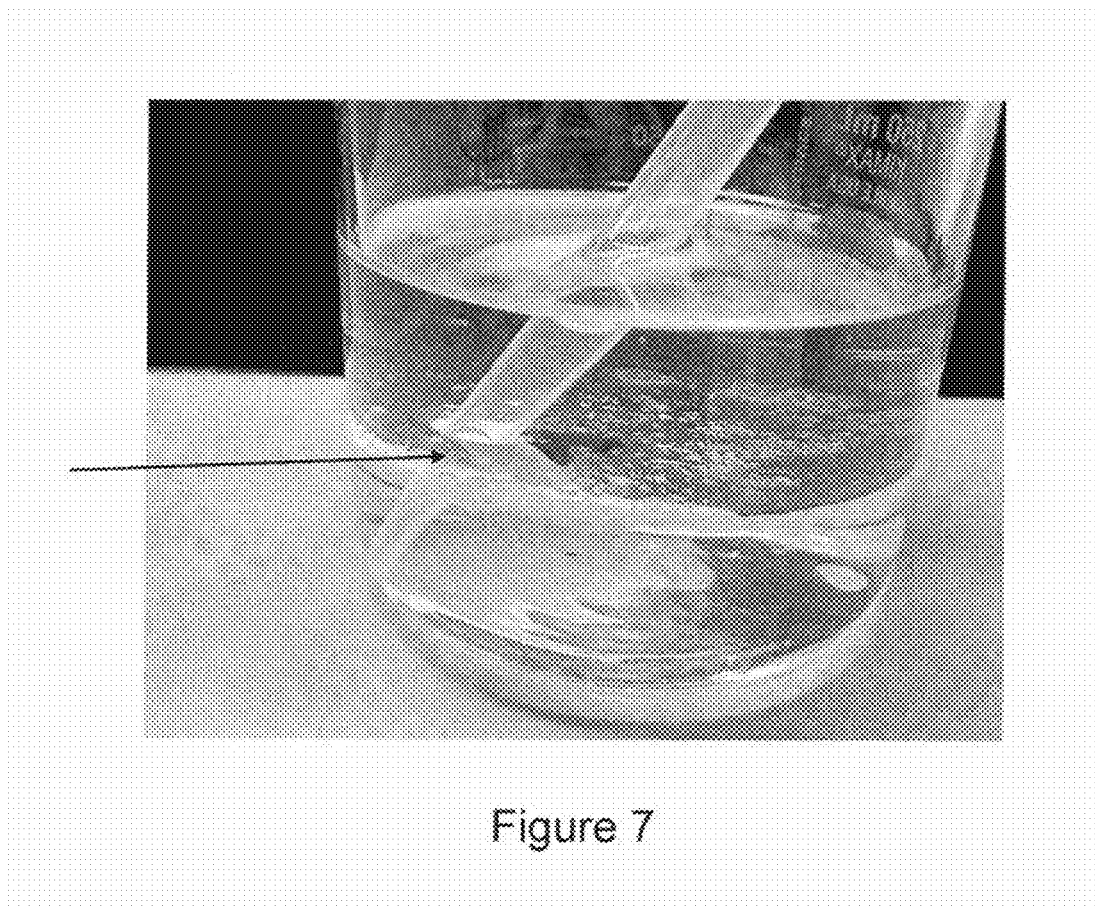
FIG. 7 is a photograph of an amino-siloxane compound with an acyl halide in an organic solution.

FIG. 7 is a photograph that shows a film of reaction product (see arrow in FIG. 7) that formed at the interface between an aqueous solution of 250 ppm of OFX-8600 and an organic solution of 0.2% TMC. This film is formed in the absence of MPD and TEACSA.

Table 5 below, provides x-ray fluorescence data of Examples 3, 4 and 5, which measures amounts of silicon.

TABLE 5

Percent Silicon (mean) before and after 5.5 hours of reverse osmosis flushing.

| Sample | Percent Silicon (mean) | Percent Silicon after 5.5 hours of flushing (mean) |
| --- | --- | --- |
| Example 3 | 0.00 | 0.00 |
| Example 4 | 0.24 | 0.23 |
| Example 5 | 0.09 | 0.09 |

The detection of silicon in these membranes and the film shown in FIG. 7 indicate that the amino-siloxane compounds are able to react with difunctional or polyfunctional acyl halides to form a reaction product that may be incorporated within the polyamide matrix. This reaction product may be in addition to the polyamide film formed on the porous substrate by the reaction of the aqueous phase, the organic phase and the additive.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art.

What is claimed is:

1. A composite membrane for reverse osmosis or nanofiltration, the membrane comprising:
   a porous substrate;
   a polymer layer on a surface of the porous substrate, wherein the polymer layer comprises a reaction product of (i) a polyacyl halide that is soluble in an organic phase, (ii) an amine that is soluble in an aqueous phase, and (iii) an amino-siloxane compound wherein the amino siloxane compound is different from the amine and is a compound selected from the group consisting of:
   (I) a compound of the formula

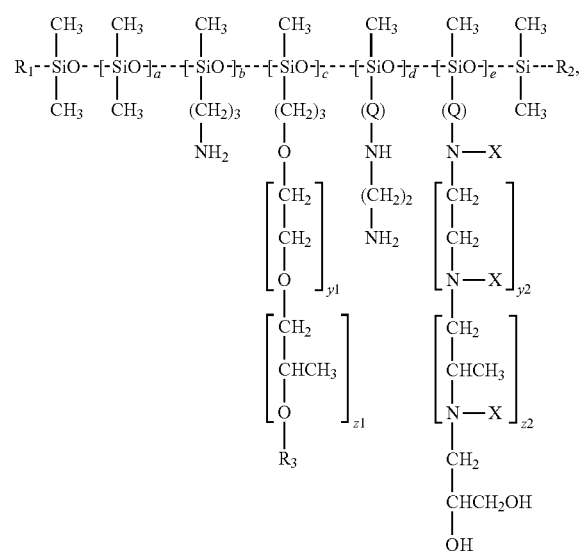

wherein R1 and R2 may be the same or different, and are C1-C20 alkyl or alkoxy groups; R3 may be a C1-C4 alkyl group, or H; Q is either $-(CH_2)_3-$ or $-CH_2CH(CH_3)CH_2-$; X is either $-CH_2CH(OH)CH_2OH$ or H; a, b, c, d, e are integers such that the sum of a+b+c+d+e is less than 100, if b is 0, then d or e must be greater than 0, if d is 0, then b or e must be greater than 0; and if e is 0, then b or d must be greater than 0; and, y1, y2, z1, z2 are each integers between 0 to 10;

(II) a compound of the formula

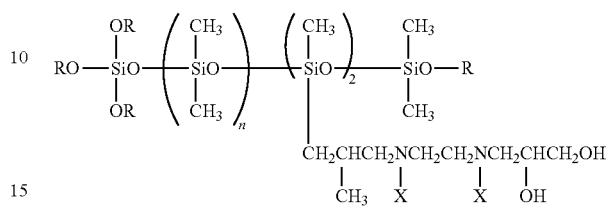

wherein R is $CH_3$ to $C_{15}H_{31}$; X is 75% of $-CH_2CH(OH)CH_2OH$ and 25% H; and n is an integer between 1 and 100;

(III) a compound of the formula

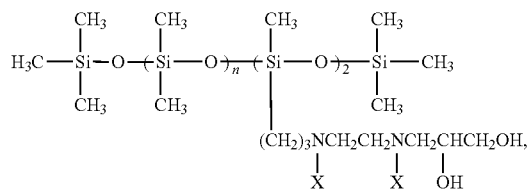

wherein x is either $-CH_2CH(OH)CH_2OH$ or H; and n is an integer between 4 and 100;

(IV) a compound of the formula

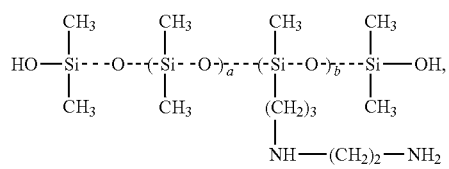

wherein a and b are integers between 1 and 100 and the sum of a+b is not greater than 100;

(V) a compound of the formula

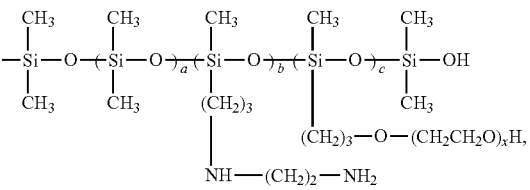

wherein a, b and c are integers between 1 and 100, the sum of a+b+c is not greater than 100 and x is an integer between 1 and 50;

(VI) the compound according to formula

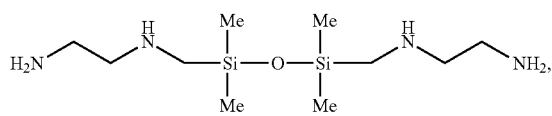 [SMILES: C[Si](C)(CNCCN)O[Si](C)(C)CNCCN]

(VII) the compound according to formula
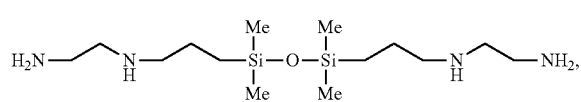 [SMILES: C[Si](C)(CCCNCCN)O[Si](C)(C)CCCNCCN]
(VIII) the compound according to formula
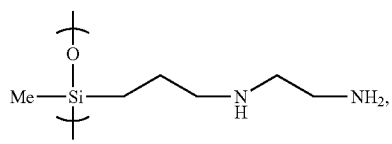
(IX) the compound according to formula
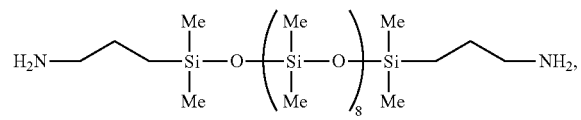
(X) the compound according to formula
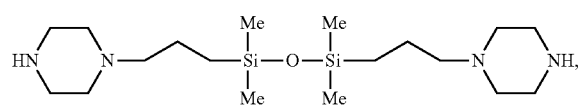
(XI) the compound according to formula
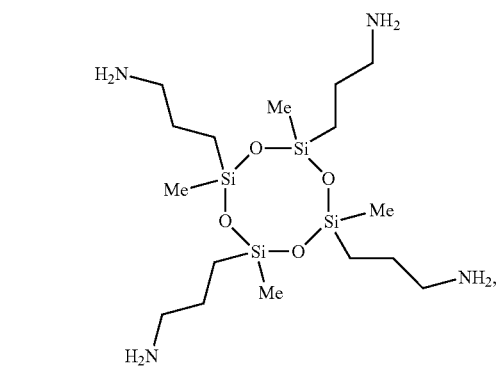 [SMILES: C[Si]1(CCCN)O[Si](C)(CCCN)O[Si](C)(CCCN)O[Si](C)(CCCN)O1]
(XII) the compound according to formula
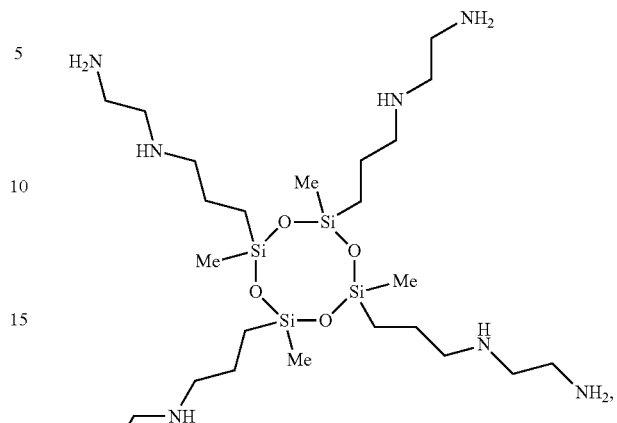
(XIII) the compound according to formula
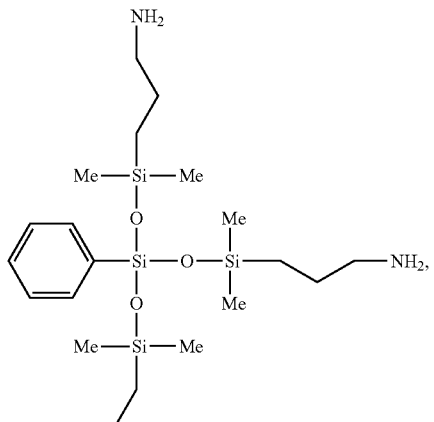
(XIV) the compound according to formula
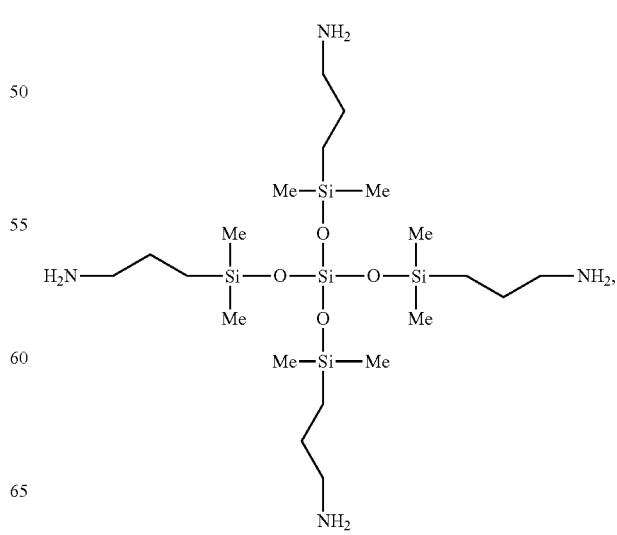

(XV) the compound according to formula

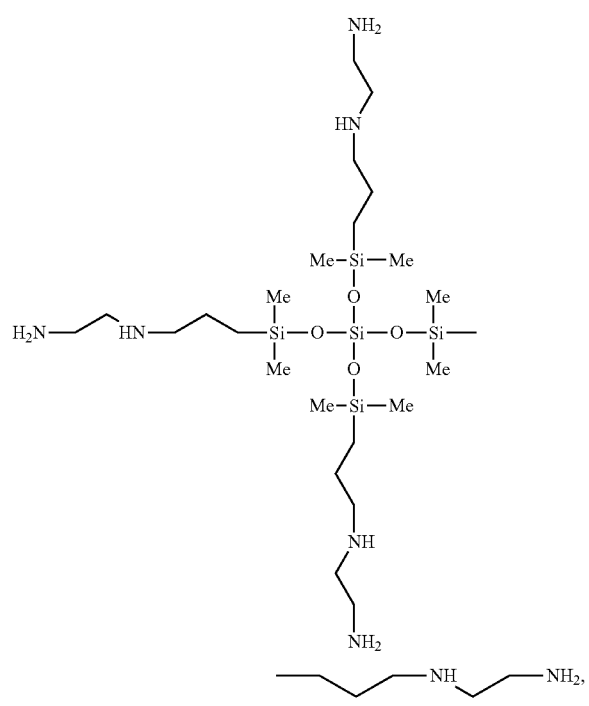

(XVI) the compound according to formula

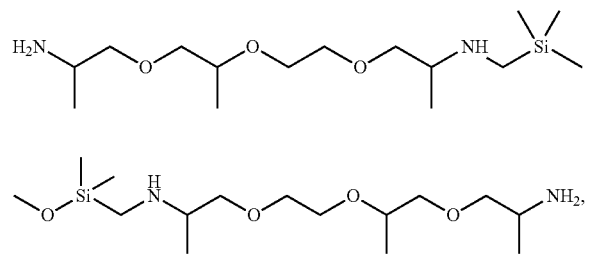

and (XVII) the compound according to formula

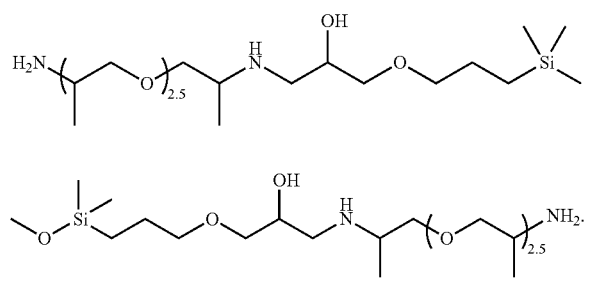

2. The composite membrane of claim 1 wherein the amino-siloxane compound is a compound of the formula:

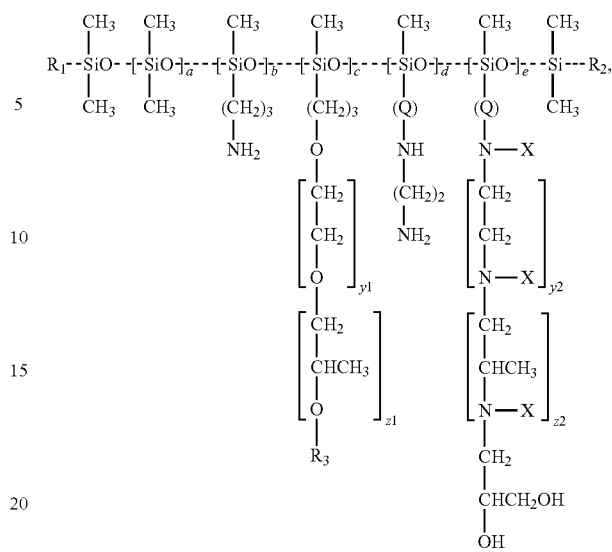

wherein R1 and R2 may be the same or different, and are C1-C20 alkyl or alkoxy groups; R3 may be a C1-C4 alkyl group, or H; Q is either —(CH$_2$)$^3$— or —CH$_2$CH(CH$_3$)CH$_2$—; X is either -CH$_2$CH(OH)CH$_2$OH or H; a, b, c, d, e are integers such that the sum of a+b+c+d+e is less than 100, if b is 0, then d or e must be greater than 0, if d is 0, then b or e must be greater than 0; and if e is 0, then b or d must be greater than 0; and, y1, y2, z1, z2 are each integers between 0 to 10.

3. The composite membrane of claim 1 wherein the amino-siloxane compound is a compound of the formula:

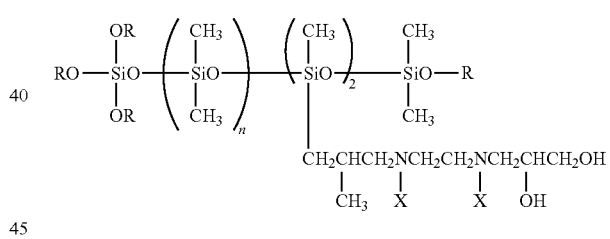

wherein R is CH$_3$ to C$_{15}$H$_{31}$; X is 75% of —CH$_2$CH(OH)CH$_2$OH and 25% H; and n is an integer between 1 and 100.

4. The composite membrane of claim 1 wherein the amino-siloxane compound is a compound of the formula:

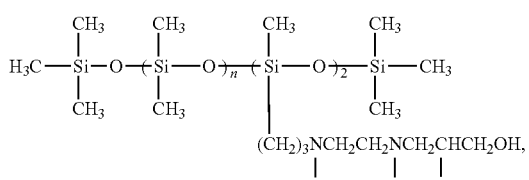

wherein x is either —CH$_2$CH(OH)CH$_2$OH or H; and n is an integer between 4 and 100.

5. The composite membrane of claim 1 wherein the amino-siloxane compound is a compound selected from the group consisting of:

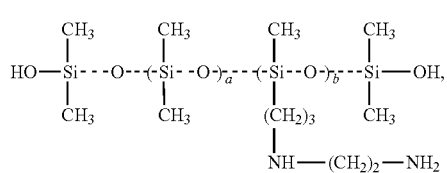
wherein a and b are integers between 1 and 100 and the sum of a+b is not greater than 100;
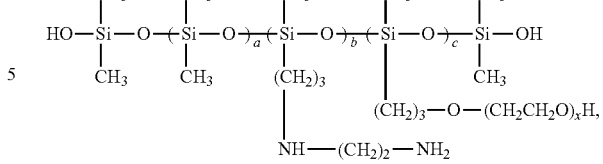
wherein a, b and c are integers between 1 and 100, the sum of a+b+c is not greater than 100 and x is an integer between 1 and 50;
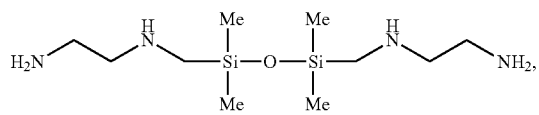
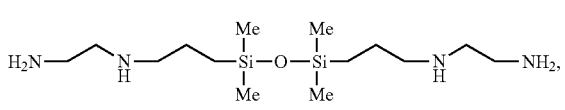
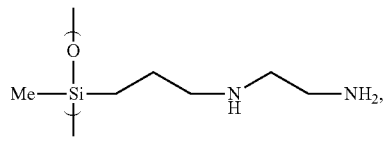
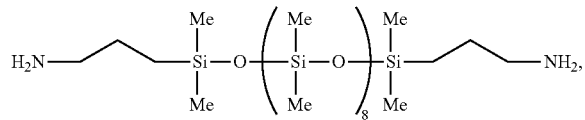
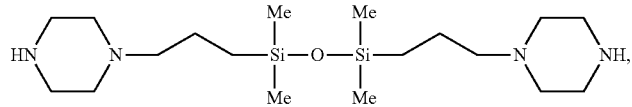
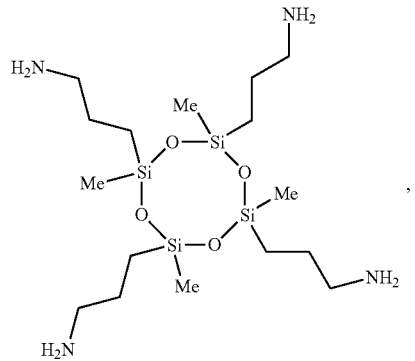
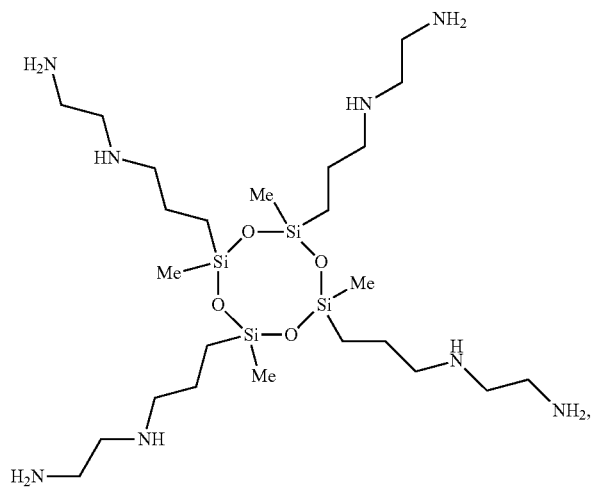
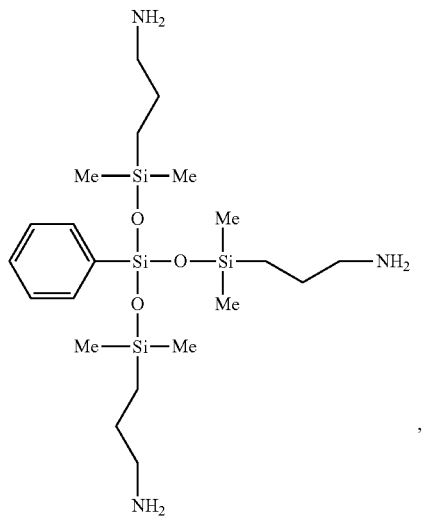

-continued
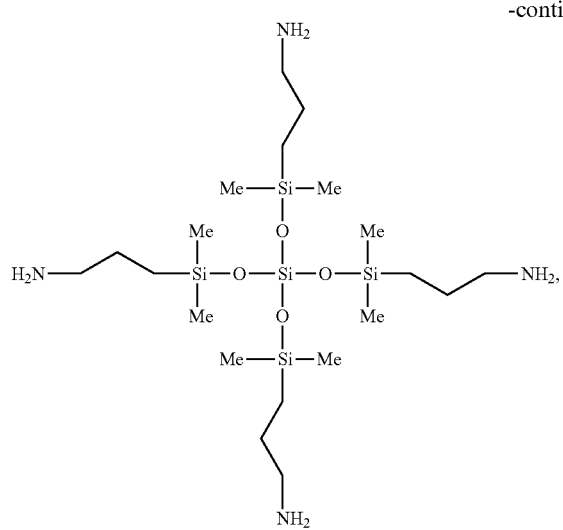
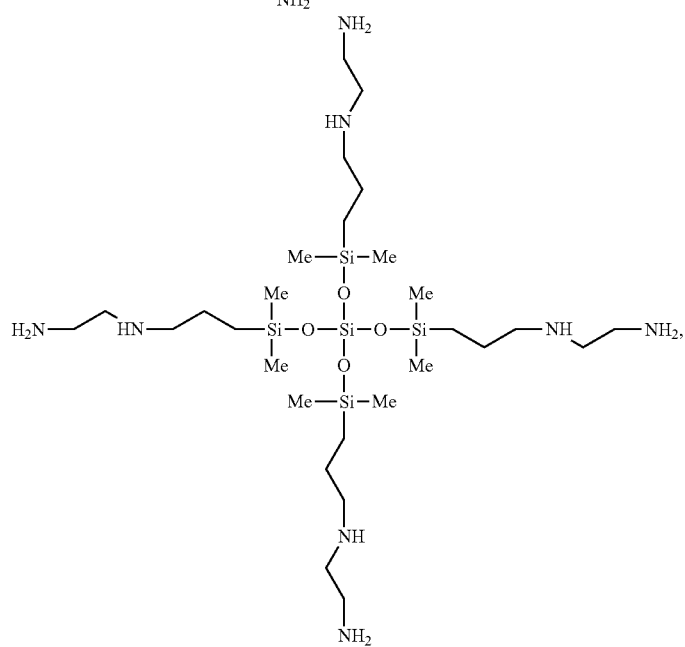
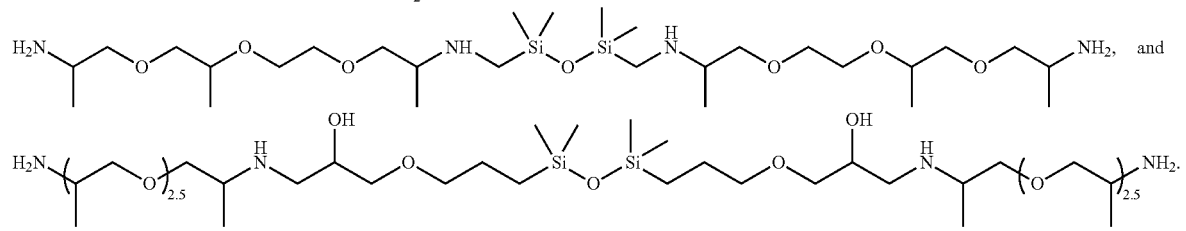
6. The composite membrane of claim 1 wherein the polyacyl halide is trimesoyl chloride.
* * * * *